(12) United States Patent
Ahn et al.

(10) Patent No.: US 11,296,898 B2
(45) Date of Patent: Apr. 5, 2022

(54) VIDEO CALL MEDIATING APPARATUS, METHOD AND COMPUTER READABLE RECORDING MEDIUM THEREOF

(71) Applicant: HYPERCONNECT INC., Seoul (KR)

(72) Inventors: Sang Il Ahn, Chungcheongbuk-do (KR); Jun Seok Gye, Seoul (KR); Hyeok Hwa Seong, Seoul (KR)

(73) Assignee: Hyperconnect Inc., Seoul (KR)

( * ) Notice: Subject to any disclaimer, the term of this patent is extended or adjusted under 35 U.S.C. 154(b) by 16 days.

(21) Appl. No.: 17/004,207

(22) Filed: Aug. 27, 2020

(65) Prior Publication Data

US 2021/0067362 A1 Mar. 4, 2021

(30) Foreign Application Priority Data

Aug. 27, 2019 (KR) .................. 10-2019-0104869

(51) Int. Cl.
*G06F 15/16* (2006.01)
*H04L 12/18* (2006.01)
*G06K 9/00* (2022.01)

(52) U.S. Cl.
CPC ...... *H04L 12/1822* (2013.01); *G06K 9/00315* (2013.01); *H04L 12/1818* (2013.01)

(58) Field of Classification Search
None
See application file for complete search history.

(56) References Cited

U.S. PATENT DOCUMENTS

| 8,812,519 | B1 | 8/2014 | Bent |
| 10,384,136 | B2 | 8/2019 | Chae et al. |
| 10,599,734 | B2 | 3/2020 | Ahn et al. |
| 10,706,118 | B1 * | 7/2020 | Yang ................... G06F 16/9574 |
| 10,810,276 | B2 | 10/2020 | Ahn et al. |
| 10,984,488 | B1 | 4/2021 | Colucci |
| 2004/0076280 | A1 | 4/2004 | Ando et al. |
| 2004/0107144 | A1 | 6/2004 | Short |

(Continued)

FOREIGN PATENT DOCUMENTS

| CN | 101827317 A | 9/2010 |
| CN | 104737097 A | 6/2015 |

(Continued)

OTHER PUBLICATIONS

Extended European search report dated Sep. 28, 2020 of European Patent Application No. 20192980.9.

(Continued)

*Primary Examiner* — Phyllis A Book
(74) *Attorney, Agent, or Firm* — KPPB LLP (57) ABSTRACT

A video call mediating apparatus, method and computer readable recording medium. The video call mediating method according to an embodiment of the present disclosure includes connecting a plurality of terminals to a video call platform, computing a number of users of a first gender and a number of users of a second gender from among users of the plurality of terminals connected to the video call platform, computing a first value that is a ratio of the number of the users of the second gender to the number of the users of the first gender, and transmitting an item usable in the video call platform to terminals of at least some of the users of the first gender in response to computed ratio.

19 Claims, 8 Drawing Sheets

(56) References Cited

U.S. PATENT DOCUMENTS

| | | |
|---|---|---|
| 2008/0080745 A1 | 4/2008 | Vanhoucke et al. |
| 2009/0271244 A1 | 10/2009 | Kalasapur et al. |
| 2011/0289433 A1 | 11/2011 | Whalin et al. |
| 2012/0004954 A1 | 1/2012 | Eisinger et al. |
| 2014/0040368 A1 | 2/2014 | Janssens |
| 2014/0074824 A1 | 3/2014 | Rad et al. |
| 2014/0172893 A1 | 6/2014 | Carter |
| 2014/0280600 A1 | 9/2014 | Jeon |
| 2015/0067070 A1 | 3/2015 | Jacques et al. |
| 2015/0341297 A1 | 11/2015 | Barfield et al. |
| 2015/0352451 A1* | 12/2015 | Brenden ............... A63F 13/86 463/31 |
| 2016/0043987 A1 | 2/2016 | Ahn et al. |
| 2016/0055571 A1 | 2/2016 | Wouhaybi et al. |
| 2016/0127500 A1 | 5/2016 | Rad |
| 2016/0307259 A1 | 10/2016 | Lubeck et al. |
| 2017/0127123 A1* | 5/2017 | Lidow ................ H04N 21/4331 |
| 2017/0142482 A1* | 5/2017 | Zhou ................ H04N 21/25883 |
| 2017/0351770 A1 | 12/2017 | Ahn et al. |
| 2018/0046946 A1 | 2/2018 | Mason, Jr. et al. |
| 2018/0048597 A1* | 2/2018 | Li ........................ H04L 12/1813 |
| 2018/0349703 A1* | 12/2018 | Rathod ................ A63F 13/213 |
| 2020/0110788 A1 | 4/2020 | Ahn et al. |
| 2020/0145609 A1 | 5/2020 | Ahn et al. |
| 2020/0226193 A1 | 7/2020 | Ahn et al. |
| 2021/0011966 A1 | 1/2021 | Ahn et al. |
| 2021/0065314 A1 | 3/2021 | Storment et al. |
| 2021/0075883 A1 | 3/2021 | Ahn et al. |
| 2021/0182536 A1 | 6/2021 | Ahn et al. |
| 2021/0266498 A1 | 8/2021 | Ahn et al. |

FOREIGN PATENT DOCUMENTS

| | | | |
|---|---|---|---|
| CN | 105247845 A | 1/2016 | |
| CN | 105308638 A | 2/2016 | |
| JP | 2002109025 A | 4/2002 | |
| JP | 2005092897 A | 4/2005 | |
| JP | 2011081575 A | 4/2011 | |
| JP | 2013020485 A | 1/2013 | |
| JP | 2015517153 A | 6/2015 | |
| JP | 2016076078 A | 5/2016 | |
| JP | 2017045342 A | 3/2017 | |
| JP | 2019149057 A | 9/2019 | |
| KR | 20000054824 A | 9/2000 | |
| KR | 10-2003-0094156 A | 12/2003 | |
| KR | 20090014473 A | 2/2009 | |
| KR | 10-2009-0065147 A | 6/2009 | |
| KR | 20100023465 A | 3/2010 | |
| KR | 20110035651 A * | 4/2011 | |
| KR | 20130012155 A | 2/2013 | |
| KR | 20130057936 A | 6/2013 | |
| KR | 20140087175 A | 7/2014 | |
| KR | 20150010988 A | 1/2015 | |
| KR | 20150029772 A | 3/2015 | |
| KR | 10-2015-0055634 A | 5/2015 | |
| KR | 101700115 B1 | 1/2017 | |
| KR | 10-2019-0080377 A | 7/2019 | |
| KR | 20190077654 A | 7/2019 | |
| WO | WO-01/67760 A1 | 9/2001 | |
| WO | WO-0167760 A1 * | 9/2001 | ............ H04N 7/147 |
| WO | 2013081345 A1 | 6/2013 | |
| WO | WO-2015036817 A1 * | 3/2015 | ............ H04L 51/32 |
| WO | WO-2017080169 A1 * | 5/2017 | ............ G06Q 30/02 |

OTHER PUBLICATIONS

Korean Office Action for Application No. 10-2019-0104869, dated Jul. 21, 2020.
Extended European Search Report for European Application No. 20195016.9, Search completed Nov. 20, 2020, dated Dec. 3, 2020, 9 Pgs.
Extended European Search Report for European Application No. 20214672.6, Search completed Mar. 12, 2021, dated Mar. 24, 2021, 10 Pgs.
First Office Action of corresponding Korean Patent Application 10-2016-0069563, dated Dec. 8, 2016, 9 Pgs.
International Search Report and Written Opinion for International Application No. PCT/KR2018/001315, Search completed May 16, 2021, dated May 17, 2018, 11 Pgs.
Korean Office Action for Application No. 10-2019-0111491, dated Aug. 24, 2020, 11 Pgs.
Office Action of corresponding Chinese Patent Application No. 2017-10407120.7, dated Aug. 5, 2019, 16 Pgs.
Bao et al., "CVAE-GAN: Fine-Grained Image Generation through Asymmetric Training", Arxiv.Org, Cornell University Library, 201 Olin Library Cornell University Ithaca, NY 14853, Mar. 29, 2017, pp. 1-15.
Iyengar et al., "Koinophilia and human facial attractiveness", Resonance—Journal of Science Education, Indian Academy of Sciences, India, vol. 20, No. 4, May 3, 2015, pp. 311-319.

* cited by examiner

VIDEO CALL MEDIATING APPARATUS, METHOD AND COMPUTER READABLE RECORDING MEDIUM THEREOF

CROSS-REFERENCE TO RELATED APPLICATION

This application claims priority to Korean Patent Application No. 10-2019-0104869, filed on Aug. 27, 2019, in the Korean Intellectual Property Office, the disclosure of which is incorporated herein in its entirety by reference.

BACKGROUND

1. Field

The present disclosure relates to a video call mediating apparatus, method and computer readable recording medium thereof, and more particularly, to a video call mediating apparatus that is capable of providing a service that may provide new user experience, and improving sales therethrough, and a method and computer readable recording medium thereof.

2. Description of the Related Art

With the development of communication technology and miniaturization of electronic devices, personal terminals are being widely used by general consumers. In particular, portable personal terminals such as smart phones or smart tablets have been widely used in recent years.

Most of the portable personal terminals comprise communication functions and are thus able to be connected to a communication network and exchange data with other terminals. For example, they can exchange images and voice with the other terminals.

Using such a function, a video call can be made between a plurality of terminals. When the terminals are connected to a video call platform and are provided with a video call service, a video call can be made between people who do not know each other.

Meanwhile, video call services may include various types of services. They may be provided for free, but they may also be provided for a fee depending on the type. Video call service providers can induce inflow of new users through free services, and generate revenue through paid services.

SUMMARY

A purpose of the present disclosure is to provide a video call mediating apparatus that is capable of improving sales through provision of a free service, and a method and computer readable recording medium thereof.

A video call mediating method according to an embodiment of the present disclosure includes connecting a plurality of terminals to a video call platform; computing a number of users of a first gender and a number of users of a second gender from among users of the plurality of terminals connected to the video call platform in order to be provided with a video call service; computing a first value that is a ratio of the number of the users of the second gender to the number of the users of the first gender; and transmitting an item that is usable in the video call service to terminals of at least some of the users of the first gender in response to the computed ratio.

Further, the transmitting of the item may comprises comparing the computed first value and a preset second value, and transmitting the item if the first value is greater than or equal to the second value.

Further, the item enables a terminal to establish a video call session with a terminal of an opposite gender user.

Further, the transmitting of the item may comprises transmitting the item to terminals of users of the first gender, who do not have a purchasing history in the video call platform.

Further, the transmitting of the item may comprises randomly selecting some of the users of the first gender not having the purchasing history and transmitting the item to terminals of the selected users.

Further, the video call mediating method may further include computing a number of users of the first gender having definite demand for an opposite gender user; and computing a third value that is a ratio of the number of the users of the first gender having definite demand to a number of entire users of the first gender, wherein the transmitting of the item comprises preventing the item from being transmitted if the computed third value is greater than or equal to a preset fourth value.

Further, the user of the first gender having definite demand may be a user having 100% probability of being matched with an opposite gender user in all video call sessions.

Further, the video call platform may establish a video call session between two terminals randomly selected from among the plurality of terminals.

Further, the transmitting of the item may further comprises transmitting the item to at least some of terminals of users of the first gender not connected to the video call platform.

Meanwhile, a computer readable recording medium having recorded thereon a computer-readable program for executing the video call mediating method according to the present disclosure may be provided.

Meanwhile, an image call mediating apparatus according to an embodiment of the present disclosure includes a database configured to store user information of a user subscribing to a video call service; a processor; and a memory configured to store instructions that are executable by the processor, wherein the processor, by executing the instructions, computes a number of users of a first gender and a number of users of a second gender from among users of a plurality of terminals connected to a video call platform in order to be provided with the video call service, computes a first value that is a ratio of the number of the users of the second gender to the number of the users of the first gender; and transmits an item that is usable in the video call service to terminals of at least some of the users of the first gender in response to the computed ratio.

Further, the processor may compare the computed first value and a preset second value, and if the first value is greater than or equal to the second value, transmit the item.

Further, the item enables a terminal to establish a video call session with a terminal of an opposite gender user.

Further, the processor may transmit the item to terminals of users of the first gender, who do not have a purchasing history in the video call platform.

Further, the processor may randomly select some of the users of the first gender not having the purchasing history and transmit the item to terminals of the selected users.

Further, the processor may further compute a number of users of the first gender having definite demand for an opposite gender user and a third value that is a ratio of the number of the users of the first gender having definite demand to a number of entire users of the first gender, and the processor may prevent the item from being transmitted if the computed third value is greater than or equal to a preset fourth value.

Further, the users of the first gender having definite demand may be a user who has 100% probability of being matched with an opposite gender user in all video call sessions.

Further, the processor may establish a video call session between two terminals selected from among the plurality of terminals.

Further, the processor may transmit the item to at least some of terminals of users of the first gender not connected to the video call platform.

The present disclosure may provide a video call mediating apparatus that is capable of improving sales through provision of a free service, and a method and computer readable recording medium thereof.

DETAILED DESCRIPTION

The advantages and characteristics of the present disclosure, and the method for achieving those advantages and characteristics will be clarified with reference to the embodiments that will be described hereinafter together with the drawings attached hereto. However, the present disclosure is not limited to the embodiments disclosed hereinafter, but may be implemented in various different forms, and the present embodiments are provided merely for the purpose of complete disclosure of the present disclosure, and for the purpose of informing a person skilled in the art of the complete scope of the present disclosure, and the present disclosure is to be defined only by the scope of the claims. Like reference numerals indicate like components throughout the entirety of the specification.

Even though "a first" or "a second" and the like are used to describe various components, these components are not limited by the aforementioned terms. The aforementioned terms can only be used to differentiate one component from other components. Therefore, a first component mentioned hereinafter may be a second component within the technical idea of the present disclosure.

The terms used in the present specification were used to describe the embodiments, and not to limit the present disclosure. In the present specification, a singular form includes plural forms unless specially mentioned otherwise. "Comprises" or "comprising" used in the present specification imply that the mentioned component or step does not exclude the presence or addition of one or more other component or step.

Unless defined otherwise, all the terms used in the present specification may be construed to mean what may be commonly understood by a person skilled in the art. Further, the terms defined in generally used dictionaries should not be construed ideally or overly unless clearly defined specially.

Figure 1:
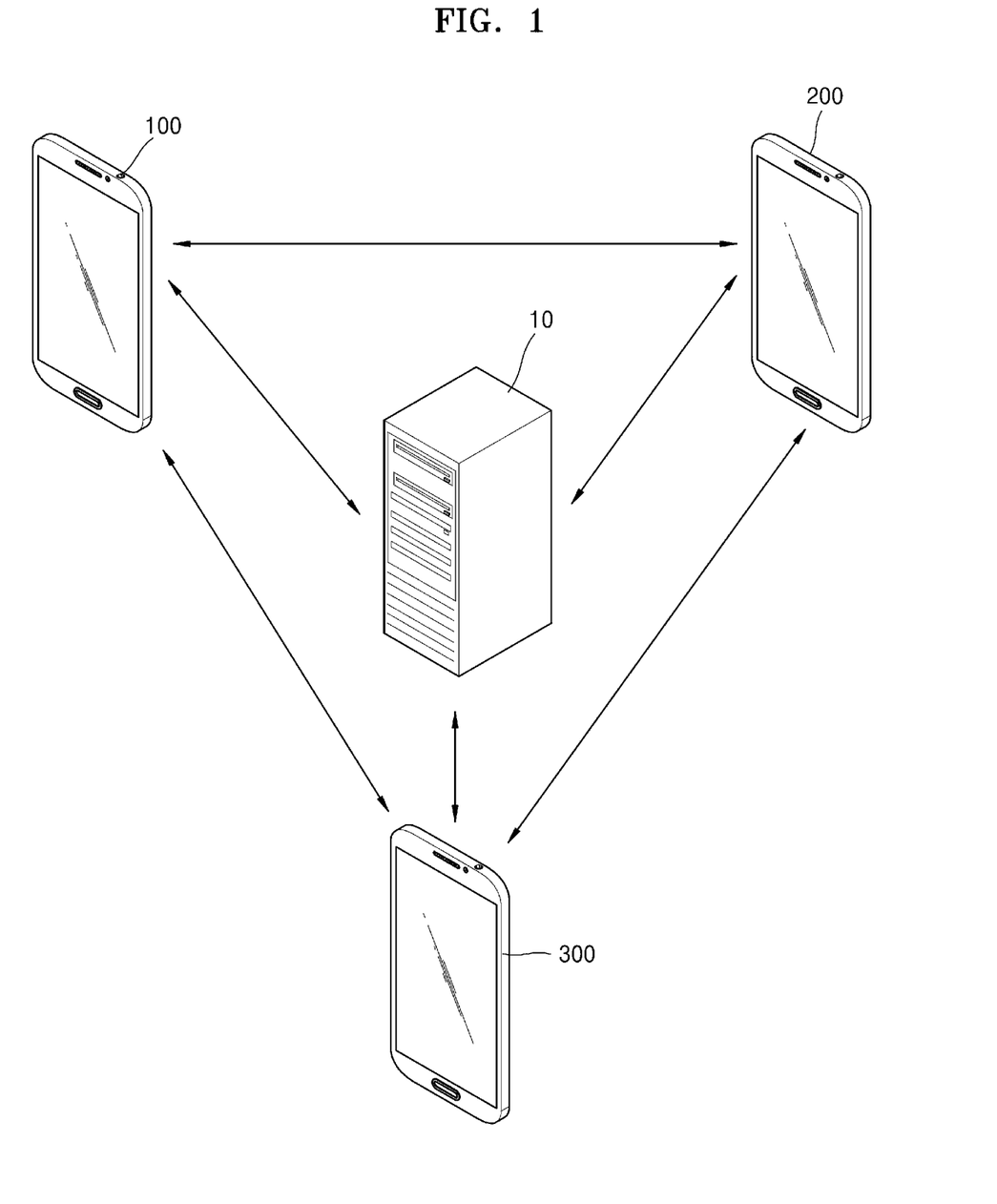
FIG. 1 is a view schematically illustrating an environment where a video call mediating apparatus according to an embodiment of the present disclosure operates.

FIG. 1 is a view schematically illustrating an environment where a video call mediating apparatus according to the present disclosure operates.

Referring to FIG. 1, the environment where a first terminal 100, a second terminal 200, and a third terminal 300 operate may include a server 10, and the first terminal 100, the second terminal 200, and the third terminal 300, that are interconnected with the server 10. For convenience of description, FIG. 1 illustrates the three terminals, that is, the first terminal 100, the second terminal 200, and the third terminal 300 only, but more terminals may be included. To the terminals that may be further added, unless mentioned otherwise, the description regarding the first terminal 100, the second terminal 200, and the third terminal 300, may be applied.

The server 10 may be connected to a communication network. The server 10 may be interconnected with another external device through the communication network. The server 10 may transmit data to the other interconnected device or receive data from the other interconnected device.

The communication network connected with the server 10 may include a wired communication network, a wireless communication network, or a complex communication network. The communication network may include a mobile communication network such as 3G, LTE, or LTE-A, etc. The communication network may include a wired or wireless communication network such as Wi-Fi, UMTS/GPRS, or Ethernet, etc. The communication network may include a local area communication network such as Magnetic Secure Transmission (MST), Radio Frequency IDentification (RFID), Near Field Communication (NFC), ZigBee, Z-Wave, Bluetooth, Bluetooth Low Energy (BLE), or Infra-Red communication (IR), etc. The communication network may include Local Area Network (LAN), Metropolitan Area Network (MAN), or Wide Area Network (WAN), etc.

The server 10 may be interconnected with at least one of the first terminal 100, the second terminal 200, and the third terminal 300 through the communication network. In a case where the server 10 is interconnected with the first terminal 100, the server 10 may exchange data with the first terminal 100 through the communication network. In a case where the server 10 is interconnected with the second terminal 200, the server 10 may exchange data with the second terminal 200 through the communication network. In a case where the server 10 is interconnected with the third terminal 300, the server 10 may exchange data with the third terminal 300 through the communication network.

The server 10 may receive data from at least one of the first terminal 100, the second terminal 200, and the third terminal 300. The server 10 may perform computation using the data received from at least one of the first terminal 100, the second terminal 200, and the third terminal 300. The server 10 may transmit a result of the computation to at least one of the first terminal 100, the second terminal 200, and the third terminal 300.

The server 10 may receive a video call mediation request from a plurality of terminals from among the first terminal 100, the second terminal 200, and the third terminal 300. The server 10 may select a plurality of terminals that transmitted the mediation request. For example, when the first terminal 100, the second terminal 200, and the third terminal 300 all transmitted the video call mediation request, the server 10 may select the first terminal 100 and the second terminal 200, from among the first terminal 100, the second terminal 200, and the third terminal 300.

The server 10 may mediate a video call connection between the selected first terminal 100 and the second terminal 200. For example, the server 10 may transmit connection information regarding the first terminal 100 to the second terminal 200. In another example, the server 10 may transmit connection information regarding the second terminal 200 to the first terminal 100.

The connection information regarding the first terminal 100 may include, for example, IP address and port number of the first terminal 100. The first terminal 100 that received the connection information regarding the second terminal 200 may attempt to be connected to the second terminal 200 using the received connection information.

As a connection attempt by the first terminal 100 to the second terminal 200 or a connection attempt by the second terminal 200 to the first terminal 100 succeeds, a video call session may be established between the first terminal 100 and the second terminal 200. Through this video call session, the first terminal 100 may transmit a video or sound to the second terminal 200. The first terminal 100 may encode the video or sound into digital signals, and transmit the encoded result to the second terminal 200.

Further, the first terminal 100 may receive a video or sound from the second terminal 200. The first terminal 100 may receive the video or sound encoded into digital signals, and decode the received video or sound.

Through the video call session, the second terminal 200 may transmit a video or sound to the first terminal 100. Further, through the video call session, the second terminal 200 may receive a video or sound from the first terminal 100. Thus, the user of the first terminal 100 and the user of the second terminal may make a video call with each other.

The first terminal 100, the second terminal 200, and the third terminal 300 may be, for example, a desktop computer, laptop computer, smart phone, smart tablet, smart watch, mobile terminal, digital camera, wearable device, or portable electric device, etc. The first terminal 100, the second terminal 200, and the third terminal 300 may execute a program or application. The program or application may include a program or application for performing a video call. The first terminal 100, the second terminal 200, and the third terminal 300 may be devices of a same type, or devices of different types.

Figure 2:
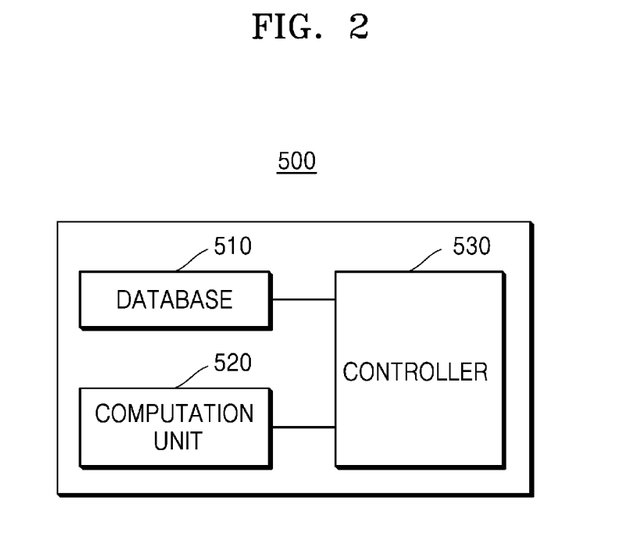
FIG. 2 is a view schematically illustrating a configuration of a video call mediating apparatus according to an embodiment of the present disclosure.

FIG. 2 is a view schematically illustrating a configuration of a video call mediating apparatus according to an embodiment of the present disclosure.

Referring to FIG. 2, the video call mediating apparatus 500 according to an embodiment of the present disclosure includes a database 510, a computation unit 520, and a controller 530. The operation unit 520 and the controller 530 may be implemented by at least one processor, and a memory may store instructions that are executable by the at least one processor. The database 510 stores user information of users subscribed to a video call service. The user information may include information of at least one of name, gender, age, hobby, interest, ID, contact number, nationality, residential area, language used, religion, race, and profile image of each user. Further, the user information may further include, besides the information disclosed in the present specification, other kinds of information that can distinguish a user from other users.

Further, the user information may further include information of a purchase history during a period in which each user used the video call service. The information of the purchase history may be understood as history of transactions since a time point when a corresponding user started to use the video call service.

The video call service may be provided through a mobile application or a web, and a service provider may provide a paid service in order to create profit. For example, a special filter that can decorate a user's face or background, a kind of ticket that can make a video call connection with a user of a certain condition, a gift that can be sent to a video call counterpart and the like may be provided for a fee.

The computation unit 520 computes a number of users with a first gender and a number of users with a second gender from among users of a plurality of terminals that are connected to a video call platform in order to be provided with the video call service. Hereinafter, for the convenience of description, it is assumed that a user with the first gender is a male user and a user with the second gender is a female user, but the present disclosure is not limited thereto. The computation unit 520 computes a number of male users and a number of female users from among users of a plurality of terminals that are connected to a video call platform in order to be provided with the video call service, and computes a first value which is a ratio of the number of female users to the number of male users.

Defining the number of male users, from among the users of the plurality of terminals currently connected to the video call platform, as M, and the number of female users, from among the users of the plurality of terminals currently connected to the video call platform, as F, the computation unit 520 computes the M value and the F value, and computes (F/M)*100 as the first value. For example, in a case where the number of male users is 100 and the number of female users is 10, the first value is 10%. In the present embodiment, the first value may be defined as the number of female users to the number of male users, but in another embodiment, the first value may be defined as the number of female users to the number of entire users, or the number of male users to the number of entire users.

The controller 530 transmits a good (virtual property such as an item) that is usable in the video call service, to the terminals of at least some of the male users in response to the computed ratio. The good is generally an item that is provided in the video call service for a fee, and if the first value computed in the computation unit 520 is greater than or equal to a preset value, it may be provided to the terminals of the at least some of the male users. In the present specification, the preset value that is subject to comparison with the first value will be defined as a second value.

The good may be understood as an item that enables a terminal to establish a video call session with a terminal of an opposite gender user. That is, taking into account that it is those some of the male users that the good will be given to, the good may be an item that enables establishing a video call session with the terminal of a female user. The item is generally provided for a fee, but depending on the size of the first value and the size of the second value, the item may be provided to some of the users for free.

The video call mediating apparatus of the present disclosure may basically select any two terminals from among the terminals that requested a video call mediation, and then establish a video call session between the two selected terminals. Users of the two terminals being connected through the video call session may be acquainted with each other, or not acquainted with each other. Further, the users of the two terminals connected through the video call session may or may not be of the same gender, and may or may not use the same language, live in the same country, or city. That is, the video call session may be established between terminals randomly selected from among numerous users who are subscribed to the video call service, and are connected to the video call platform.

Among the users using the video call service, there may be people who prefer to make a video call with users residing in a certain area, or users of an opposite gender. For example, user 1 may prefer to make a video call with a female user residing in Korea, user 2 may prefer to make a video call with a male user residing in the United States, and user 3 may prefer to make a video call with a female user residing in Japan.

As described above, since the users using the video call service may all have different genders and residential areas, gender and area preferences of all the users may not be met. Therefore, in the video call service, for mediating a video call with a user of a preferred area or a preferred gender, a predetermined price may be demanded to the user.

Among the users who prefer to make a video call with an opposite gender user, a user who is provided with the aforementioned good from the controller 530 may definitely perform a video call with an opposite gender user through the aforementioned good even without paying an additional price.

Meanwhile, as described above, the second value that is subject to comparison with the first value may be defined as a minimum value of a ratio at which departure of existing users does not occur even when the good is provided to some of the users. In a case where the ratio of the number of female users connected to the video call platform to the number of male users connected to the video call platform is smaller than the second value, if the good is provided to some of the male users, the rest of the male users who prefer a video call with an opposite gender user may logout from the video call platform, and if this situation occurs repeatedly, they may withdraw membership from the video call service. Therefore, in providing the good, it may be taken into account whether a gender ratio that is able to prevent departure of the existing users is being maintained.

The second value is not an absolute value but is determined relatively depending on circumstances, and thus the second value may vary depending on the time period, service area, etc. Further, since the second value is to be determined as the ratio that can minimize the departure of existing users, it may be determined based on statistical figures. For example, for two hours from 8pm to 10pm, the second value may be determined to be 10%.

Among the users who prefer to make a video call with an opposite gender user, from a user who made a video call with an opposite gender user through the good, it is possible to expect increase of satisfaction through the video call, and thus naturally, the purchase motivation may be increased for the good that enables to definitely perform a video call with an opposite gender user. The provider of the video call service may seek increase of service revenue by providing the good to some users for free.

In order to seek increase of service revenue, according to an embodiment of the present disclosure, the good may be transmitted to some selected male users among the male users who do not have a purchase history. The purchase history may include a history of purchasing various items of each user while using the video call service, a history of purchasing a subscription product, and a history of transmitting a gift to another user, etc. Further, as a condition to be selected as the user for being provided with the good, only the history of purchasing an item that enables to definitely perform a video call with an opposite gender user may be taken into account. Meanwhile, rather than providing the good to all the users who satisfy this condition, it is possible to randomly select only some from among all the users who satisfy this condition, and provide the good to them. That is because, providing the good to all the users who do not have a purchasing history may relatively be a disadvantage to the users who have a purchasing history.

In another embodiment of the present disclosure, the computation unit 520 may further compute a number of male users who have definite demand for female users and a third value that is a ratio of the number of male users having the definite demand to the number of entire male users.

The male user having definite demand refers to a male user for whom it is definite to meet an opposite gender user, that is, a female user in all video calls. In other words, the male user having definite demand may be understood as a user whose probability of being matched with a female user is 100% in all video call sessions, and these male users may be understood as users who purchased an item that guarantees a video call with female users.

Providing the good to some of the male users who do not have a purchasing history may lead to a situation where the male users having definite demand cannot make a video call with female users, and if the time it takes to establish a video call session with a female user increases, service use satisfaction may decrease. In addition, chances of not purchasing the item for a fee may increase. This may consequently lead to a decline in service sales revenue, and therefore, in providing the good, it is necessary to take into account the ratio of male users having definite demand.

If the third value computed in the computation unit 520 is greater than or equal to a preset fourth value, the controller 530 may prevent the item from being transmitted. It may be understood that if the ratio of male users having definite demand to the entire male users is greater than or equal to a certain value, the good will not be transmitted in order to prevent the departure of existing paid users.

Figure 3:
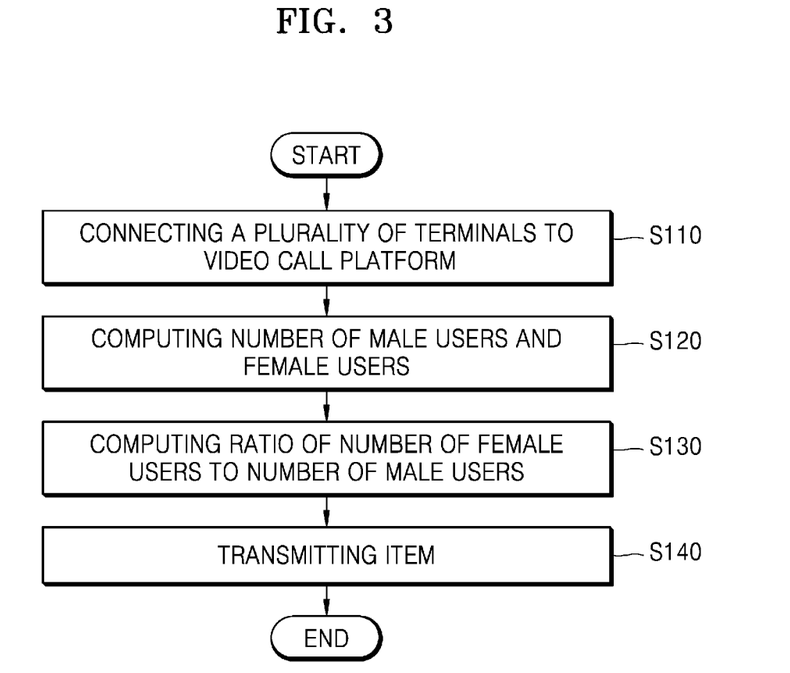
FIG. 3 is a flowchart schematically illustrating a video call mediating method according to an embodiment of the present disclosure.

FIG. 3 is a flowchart schematically illustrating a video call mediating method according to an embodiment of the present disclosure.

Referring to FIG. 3, the video call mediating method according to an embodiment of the present disclosure includes a step of connecting a plurality of terminals to a video call platform (S110), a step of computing a number of male users and a number of female users (S120), a step of computing a ratio of the number of female users to the number of male users (S130), and a step of transmitting an item (S140).

At step S110, users who intend to use the video call service use terminals to be connected to the video call platform that enables to use the video call service. The terminals may be understood as being substantially the same as the first terminal 100 to the third terminal 300 described with reference to FIG. 1. The terminals are understood to have a program or an application installed to enable using the video call service. Being connected to the video call platform is substantially the same as being connected to the server 10 described with reference to FIG. 1 or being connected to the video call mediating apparatus 500 described with reference to FIG. 2.

Users may use the video call service by executing the program or the application and then by being connected to the video call platform. Each user subscribed to the video call service may provide their user information to the video call platform. The user information may include information of at least one of a name, gender, hobby, interest, ID, contact number, nationality, residential area, language used, religion, race, and profile image of each user. Further, the user information may further include, besides the information disclosed in the present specification, other kinds of information that can distinguish a user from other users.

Further, the user information may further include information of a purchase history during a period in which each user uses the video call service. The information of the purchase history may be understood as history of transactions since a time point where a corresponding user started to use the video call service.

The video call service may be provided through a mobile application or a web, and a service provider may provide a service for a fee in order to create profit. For example, a special filter that can decorate a user's face or background, a kind of ticket that can make a video call connection with a user of a certain condition, a gift that can be sent to a video call counterpart and the like may be provided for a fee.

At step S120, a number of male users and a number of female users, from among the users of the plurality of terminals that are connected to the video call platform in order to be provided with the video call service, are computed. Defining the number of male users, from among the users of the plurality of terminals connected to the video call platform, as M, and the number of female users, from among the users of the plurality of terminals connected to the video call platform, as F, at step S120, the M value and the F value are computed. The computed M value and F value, and (M+F) value may be stored in a separate storage. Meanwhile, as the 'number of currently connected users' may differ over time, at step S120, the M value and F value may be computed at regular intervals or frequently.

At step S130, a first value, that is a ratio of the number of female numbers F to the number of male users M, is computed. That is, at step S130, (F/M)*100 is computed as the first value. For example, if the number of male users M is 100, and the number of female users F is 10, the first value is computed as 10%. In one embodiment, the first value may be defined as the number of female users F to the number of male users M, but in another embodiment, the first value may be defined as the number of female users F to the number of entire users M+F, or the number of male users M to the number of entire users M+F.

At step S140, in response to the computed ratio (the first value), a good that is usable in the video call platform is transmitted to the terminals of at least some of the male users. The good is generally an item that is provided in the video call service for a fee, and if the first value computed at step S130 is greater than or equal to a preset value, it may be provided to the terminals of the at least some of the male users. In the present specification, the preset value that is subject to comparison with the first value will be defined as a second value.

The good may be understood as an item that enables a terminal to establish a video call session with a terminal of an opposite gender user. That is, taking into account that it is those some of the male users that the good is given to, the good may be an item that enables establishing a video call session with the terminal of a female user. The item is generally provided for a fee, but depending on the size of the first value, the item may be provided to some of the users for free.

The video call mediating method of the present disclosure may basically select any two terminals from the terminals that requested a video call mediation, and then establish a video call session between the two selected terminals. Users of the two terminals being connected through the video call session may be acquainted with each other, or not acquainted with each other. Further, the users of the two terminals connected through the video call session may or may not be of the same gender, and may or may not use the same language, live in the same country, or city. That is, the video call session being established through the video call mediating apparatus of the present disclosure may be established between terminals randomly selected from among numerous users who are subscribed to the video call service, and connected to the video call platform.

Among the users using the video call service, there may be people who prefer to make a video call with a user residing in a certain area, or an opposite gender user. For example, user 1 may prefer to make a video call with a female user residing in Korea, user 2 may prefer to make a video call with a male user residing in the United States, and user 3 may prefer to make a video call with a female user residing in Japan.

As described above, since the users using the video call service may all have different genders and residential areas, gender and area preferences of all the users may not be met. Therefore, in the video call service, for mediating a video call with a user of a preferred area or of a preferred gender, a predetermined price may be demanded to the user.

Among the users who prefer to make a video call with an opposite gender user, a user who is provided with the aforementioned good may definitely perform a video call with an opposite gender user through the good even without paying an additional price.

Meanwhile, as described above, the second value that is subject to comparison with the first value may be defined as a minimum value of a ratio at which departure of existing users does not occur even when the good is provided to some of the users. In a case where the ratio of the number of female users connected to the video call platform to the number of male users connected to the video call platform is smaller than the second value, if the good is provided to some of the male users, the rest of the male users who prefer to make a video call with an opposite gender user may logout from the video call platform, and if this situation occurs repeatedly, they may withdraw membership from the video call service. Therefore, in providing the good, it may be taken into account whether a sufficient number of female users that can prevent departure of the existing users, are connected.

Among the users who prefer to make a video call with an opposite gender user, from a user who made a video call with an opposite gender user through the good, it is possible to expect increase of satisfaction through the video call, and thus naturally, the purchase motivation may be increased for the good that enables to definitely perform a video call with an opposite gender user. The provider of the video call service may seek increase of service revenue by providing the good to some users for free.

In order to seek increase of service revenue, according to an embodiment of the present disclosure, the good may be transmitted to some selected male users among the male users who do not have a purchase history. The purchase history may include a history of purchasing various items of each user while using the video call service, a history of purchasing a subscription product, and a history of transmitting a gift to another user, etc. Further, as a condition for selecting a user to be provided with the good, only the history of purchasing an item that enables to definitely perform a video call with an opposite gender user may be taken into account. Meanwhile, rather than providing the good to all users who satisfy this condition, it is possible to randomly select only some from all the users who satisfy this condition, and provide the good to them. That is because, providing the good to all the users who do not have a purchasing history may relatively disadvantage the users who have a purchasing history.

Meanwhile, in providing the good, the video call mediating apparatus and method according to the present disclosure may provide the good even to the users who are currently not connected to the video call platform. A user who is in an offline state in the video call platform may confirm that the good has been given in the form of a push message and the like. The offline state user who confirmed the message may be connected to the video call platform and then make a video call with an opposite gender user using the good.

Figure 4:
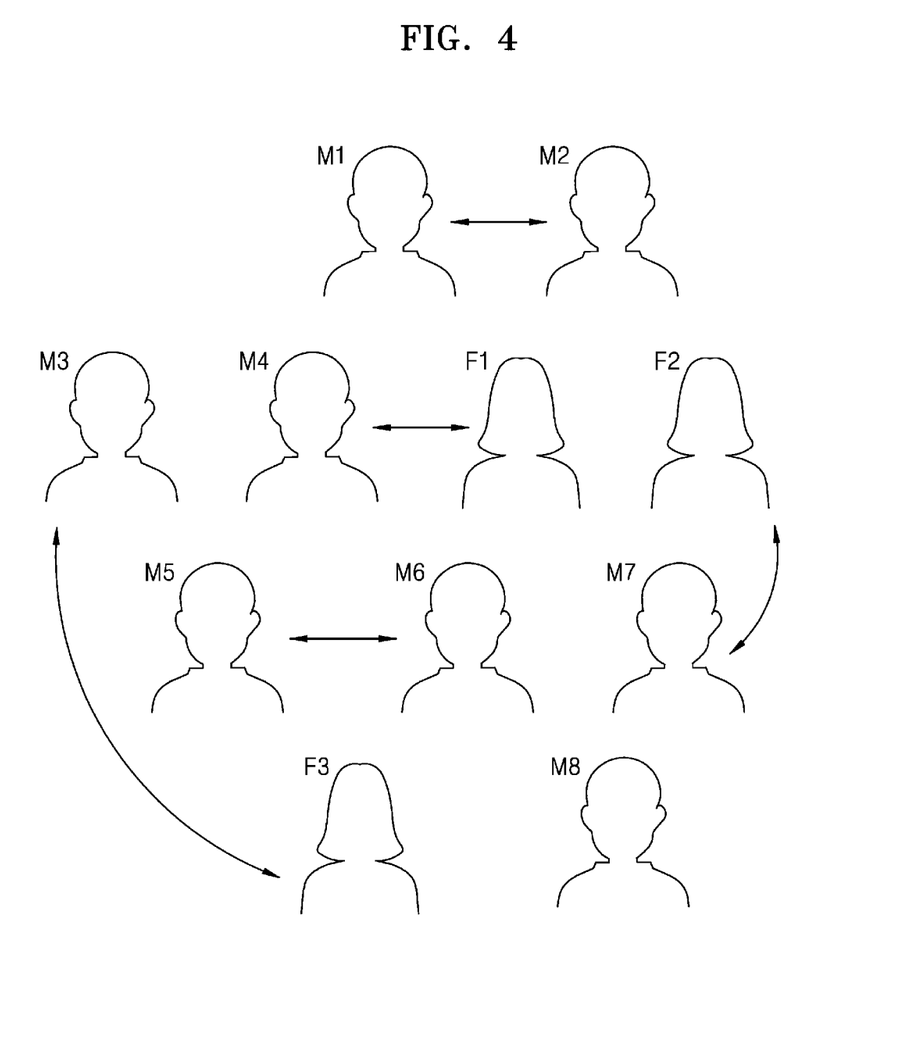
FIG. 4 is view exemplarily illustrating a form in which a video call session is established according to an embodiment of the present disclosure.

FIG. 4 is a view exemplarily illustrating a form in which a video call session may be established according to an embodiment of the present disclosure.

Referring to FIG. 4, a plurality of male users M1~M8 and a plurality of female users F1~F3 are illustrated, and the plurality of male users and female users M1~M8, F1~F3 may be understood as users who are subscribed to the video call service. In the present specification, eight male users and three female users are described as an example, but the present disclosure is not limited thereto, and therefore, it is self-evident to an ordinary skilled person in the related art that the present disclosure may be applied to more number of male users and female users.

In the example of FIG. 4, a video call session may be established between male user 1 (M1) and male user 2 (M2), between male user 4 (M4) and female user 1 (F1), between male user 5 (M5) and male user 6 (M6), between male user 3 (M3) and female user 3 (F3), and between female user 2 (F2) and male user 7 (M7).

The users making the video call through each video call session may be users who are connected to the video call platform and requested the video call mediation. Further, users who do not perform a video call M8 may be not connected to the video call platform, or even if connected to the video call platform, they may have not requested the video call mediation.

The present disclosure provides the video call mediating apparatus and method, capable of establishing a video call session between terminals that requested a video call mediation, and providing a video call service to those users. Here, the video call session may be established between some terminals randomly selected from among a plurality of terminals, and a greater number of video call sessions than the five video call sessions illustrated in FIG. 4 may be established at the same time.

When one video call session ends, the users may establish a new video call session with other users, and this operation may continue until each user ends the connection with the video call platform, or until they stop requesting a new video call mediation.

Meanwhile, although the video call service is characterized to provide a video call session established between randomly selected users, for users who have needs to designate a person with a certain condition as their video call counterpart, the video call service may provide a predetermined item.

For example, a user preferring to make a video call with an opposite gender user may purchase an item that enables to definitely perform a video call with an opposite gender user, and use the item. In FIG. 4, it is illustrated that male user 3 (M3), male user 4 (M4), and male user 7 (M7) are performing a video call with female users. Here, some users may have used the item that enables to definitely perform a video call with an opposite gender user.

Figure 5:
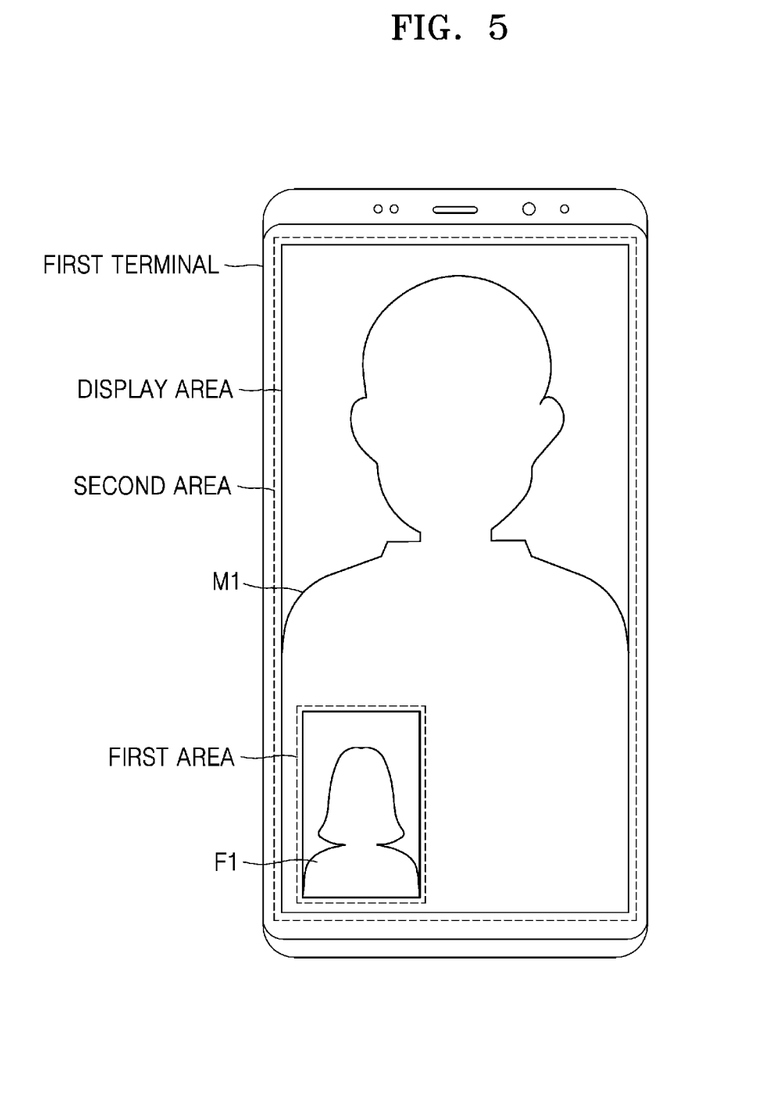
FIG. 5 is a view exemplarily illustrating a screen for performing a video call according to an embodiment of the present disclosure.

FIG. 5 is a view exemplarily illustrating a screen for performing a video call according to an embodiment of the present disclosure.

FIG. 5 exemplarily illustrates a video call screen after a video call session is established between two random users. The terminal illustrated in FIG. 5 may be a terminal of female user 1 (F1), and the terminal may have substantially the same configuration as the terminals described with reference to FIG. 1.

In the video call screen of FIG. 5, it is illustrated that the video call counterpart of female user 1 (F1) is male user 1 (M1), and when the video call session of FIG. 5 ends, female user 1 (F1) and male user 1 (M1) may each perform a new video call with other users.

For convenience of description, the terminal of female user 1 (F1) will be defined as a first terminal, and the first terminal may include a display area that includes a first area and a second area. The display area may be a general display area that is provided in the terminal to display images.

In the first area, a video obtained in the first terminal may be displayed, and as illustrated in FIG. 5, an appearance of female user 1 (F1) who is the user of the first terminal may be displayed. In the second area, a video obtained in the terminal being used by male user 1 (M1) who is the video call counterpart may be displayed. Further, in response to user's selection or terminal setting, the position and size of the first area and the second area may vary.

Figure 6:
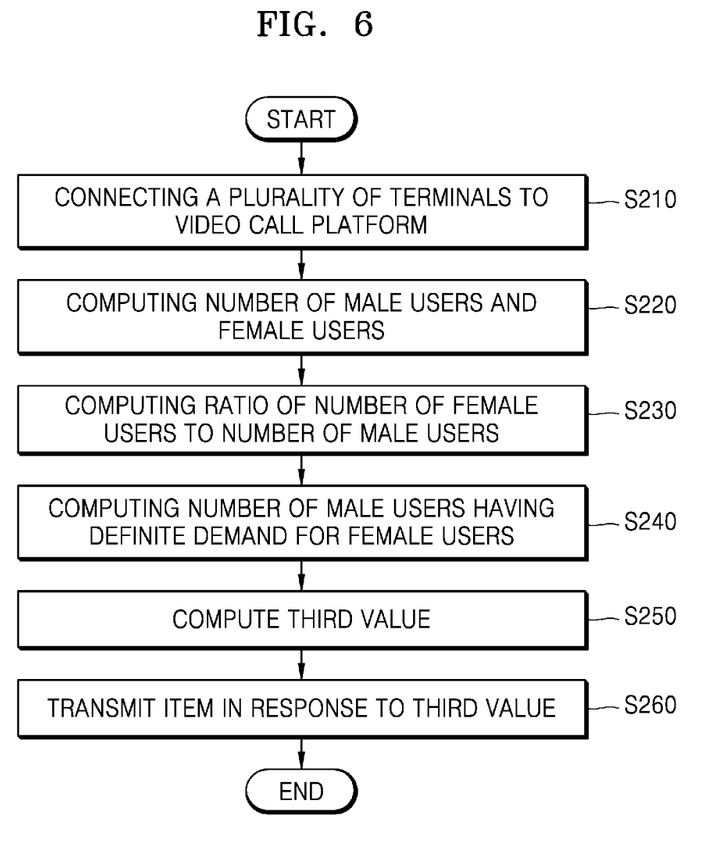
FIG. 6 is a view schematically illustrating a video call mediating method according to another embodiment of the present disclosure.

FIG. 6 is a view schematically illustrating a video call mediating method according to another embodiment of the present disclosure.

Referring to FIG. 6, the video call mediating method according to another embodiment of the present disclosure includes a step of connecting a plurality of terminals to the video call platform (S210), a step of computing a number of male users and a number of female users (S220), a step of computing a ratio of the number of female users to the number of male users (S230), a step of computing a number of male users having definite demand for a female user (S240), a step of computing a third value (S250), and a step of transmitting an item in response to the third value (S260).

At steps S210 to S230, substantially the same operations as those of steps S110 to S130 described with reference to FIG. 3 are performed, and therefore, specific descriptions of repetitive contents will be omitted.

At step S240, the number of male users having definite demand for a female user is computed, wherein a male user having definite demand refer to a male user for whom it is definite to meet an opposite gender user, that is, a female user, in all video calls. In other words, the male user having definite demand may be understood as a user whose probability of being matched with a female user in all video call sessions is 100%, and the male user corresponding thereto may be understood as a user who purchased an item that guarantees a video call with a female user.

The third value computed at step S250 is defined as a ratio of the number of male users having definite demand to a number of entire male users, and at step S260, if the computed third value is greater than or equal to a preset fourth value, the good may not be transmitted.

As described with reference to FIG. 3, the good may be provided to users who do not have a purchasing history. Providing the good to some of the male users who do not have a purchasing history may lead to a situation where the male users having definite demand cannot have a video call with a female user, and if the time it takes to establish a video call session with a female user increases, service use satisfaction may decrease. In addition, chances of not purchasing a paid item may increase. This may consequently lead to a decline in service sales revenue, and therefore, in providing the good, it is necessary to take into account the ratio of male users having definite demand.

Meanwhile, comparing the size of the third value and the size of the fourth value and determining whether to transmit the good at step S260 may be understood as, when the size of the third value is greater or equal to a certain value, not transmitting the good in order to prevent departure of existing paid users.

Figure 7:
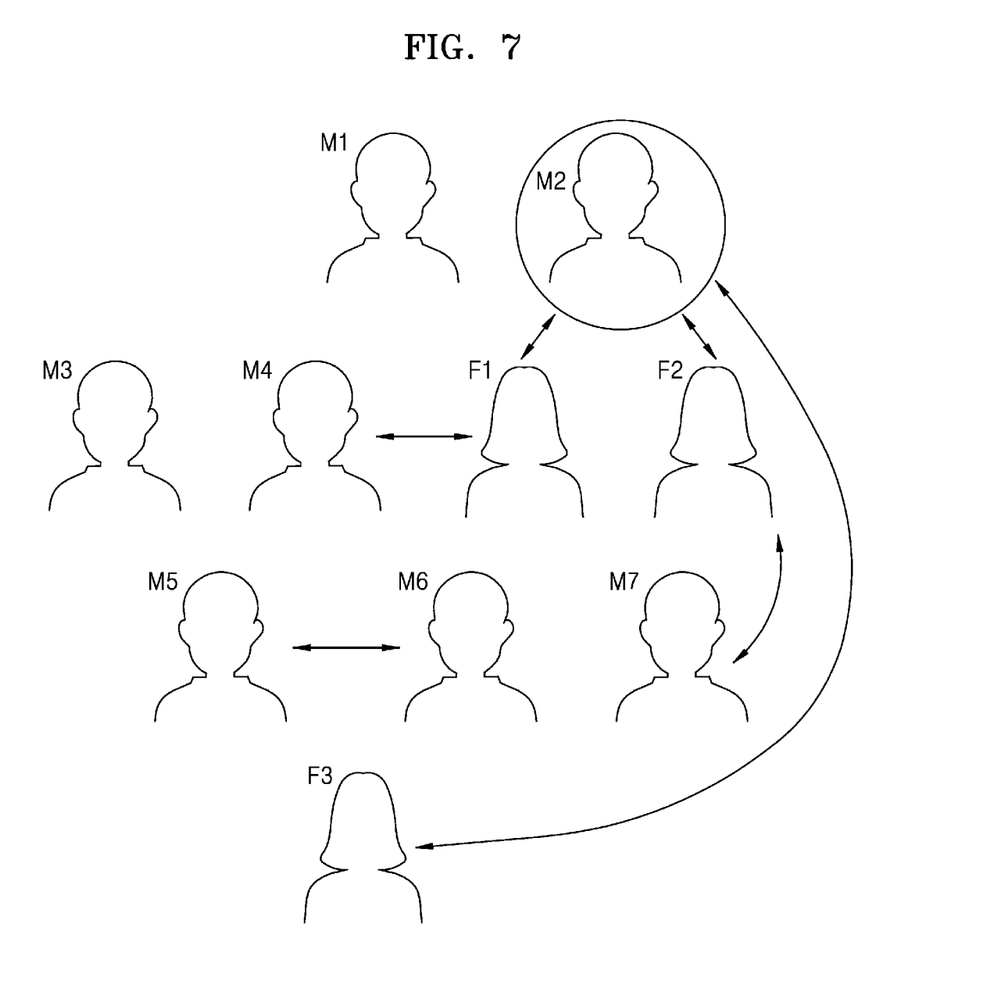
FIG. 7 is a view exemplarily illustrating a form in which a video call session is established according to another embodiment of the present disclosure.

FIG. 7 is a view exemplarily illustrating a form in which a video call session is established according to another embodiment of the present disclosure.

FIG. 7 exemplarily illustrates the male users having definite demand for an opposite gender user, and referring to FIG. 7, male user 2 (M2) may be a user having definite demand to meet a female user in all video calls. Male user 2 (M2) may be a user who purchased a paid item that enables meeting a female user in all video calls, and the paid item may either have a set number of times it may be used, or a certain amount may be charged every time a video call is established with an opposite gender user. Meanwhile, the good being provided for free may have a preset number of times a video call with an opposite gender user is guaranteed.

Figure 8:
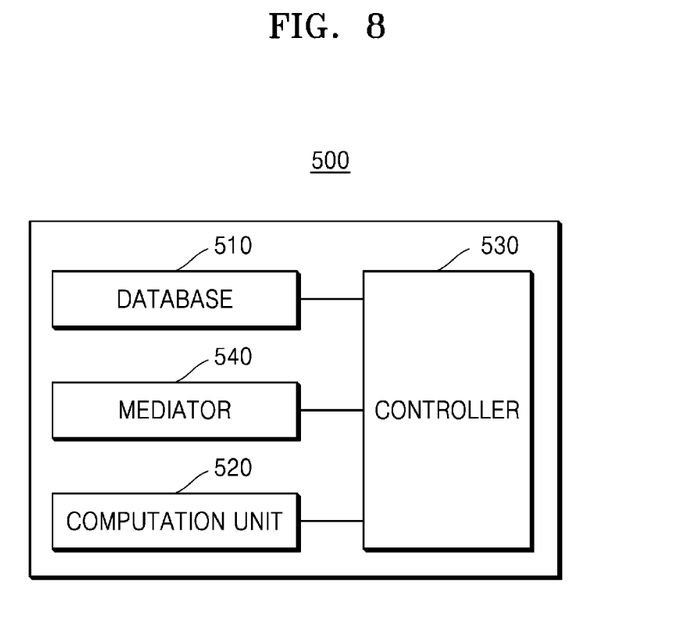
FIG. 8 is a view schematically illustrating a configuration of a video call mediating apparatus according to another embodiment of the present disclosure.

FIG. 8 is a view schematically illustrating a configuration of a video call mediating apparatus according to another embodiment of the present disclosure.

Referring to FIG. 8, the video call mediating apparatus according to another embodiment of the present disclosure 500 includes a database 510, a computation unit 520, a controller 530, and a mediator 540. The operation unit 520, the controller 530, and a mediator 540 may be implemented by at least one processor, and a memory may store instructions that are executable by the at least one processor. The database 510, the computation unit 520, and the controller 530 are substantially the same as the database 510, the computation unit 520, and the controller 530 described with reference to FIG. 2, and therefore, specific description of repetitive contents will be omitted.

The mediator 540 establishes a video call session between two terminals selected from among a plurality of terminals that requested a video call mediation. The two terminals being connected through the video call session are terminals that requested a video call mediation, respectively, and users of both terminals may not be acquainted with each other. Further, the mediator 540 may randomly select two terminals from among a plurality of terminals that requested a video call mediation and connect them through a video call session.

Meanwhile, a video call counterpart of a user who uses an item that enables to make a video call with a user residing in a certain area, or of a user who uses an item that enables to make a video call with a certain gender user, may be randomly selected from among users satisfying corresponding conditions.

Otherwise, if there is an agreement among the users, for example, if they have registered each other as acquaintances, they may be specified as video call counterparts, and the mediator 540 may mediate a video call between such users.

The embodiments described above may be embodied in the form of recording media that include instructions executable by a computer, such as program modules that can be executed by a computer. Computer readable media may be any available media that can be accessed by a computer, and may include both volatile and nonvolatile media, and removable and nonremovable media.

Further, the computer readable media may include computer storage media. The computer storage media may include both volatile and nonvolatile, and removable and nonremovable media embodied in any method or technology for the storage of information such as computer readable instructions, data structures, program modules or other data, etc.

The embodiments of the present disclosure were described above with reference to the drawings attached, but those skilled in the art that the present disclosure pertains to will understand that the present disclosure can be implemented in other specific forms without modifying the technical spirit or essential features of the present disclosure. Therefore, it should be understood that the above-described embodiments are illustrative in all respects and not restrictive.

What is claimed is:

1. A video call mediating method comprising:
    connecting a plurality of terminals to a video call platform;
    computing a number of users of a first gender and a number of users of a second gender from among users of the plurality of terminals connected to the video call platform in order to be provided with a video call service;
    computing a first value that is a ratio of the number of the users of the second gender to the number of the users of the first gender; and
    transmitting an item that is usable in the video call service to terminals of at least some of the users of the first gender in response to the computed ratio.

2. The video call mediating method of claim 1,
    wherein the transmitting of the item comprises:
    comparing the computed first value and a preset second value; and
    transmitting the item if the first value is greater than or equal to the second value.

3. The video call mediating method of claim 1,
    wherein the item enables a terminal to establish a video call session with a terminal of an opposite gender user.

4. The video call mediating method of claim 1,
    wherein the transmitting of the item comprises transmitting the item to terminals of users of the first gender, who do not have a purchasing history in the video call platform.

5. The video call mediating method of claim 4,
    wherein the transmitting of the item comprises:
    randomly selecting some of the users of the first gender not having the purchasing history; and
    transmitting the item to terminals of the selected users.

6. The video call mediating method of claim 1, further comprising:

computing a number of users of the first gender having definite demand for an opposite gender user; and computing a third value that is a ratio of the number of the users of the first gender having definite demand to a number of entire users of the first gender, and wherein the transmitting of the item comprises preventing the item from being transmitted if the computed third value is greater than or equal to a preset fourth value.

7. The video call mediating method of claim 6, wherein the users of the first gender having definite demand is a user having 100% probability of being matched with an opposite gender user in all video call sessions.

8. The video call mediating method of claim 1, wherein the video call platform establishes a video call session between two terminals randomly selected from among the plurality of terminals.

9. The video call mediating method of claim 1, wherein the transmitting of the item further comprises transmitting the item to at least some of terminals of users of the first gender not connected to the video call platform.

10. A computer readable recording medium having recorded thereon a computer-readable program for executing the method of claim 1.

11. An image call mediating apparatus comprising:

a database configured to store user information of a user subscribing to a video call service;

a processor; and a memory configured to store instructions that are executable by the processor, wherein the processor, by executing the instructions, computes a number of users of a first gender and a number of users of a second gender from among users of a plurality of terminals connected to a video call platform in order to be provided with the video call service, computes a first value that is a ratio of the number of the users of the second gender to the number of the users of the first gender, and transmits an item that is usable in the video call service to terminals of at least some of the users of the first gender in response to the computed ratio.

12. The video call mediating apparatus of claim 11, wherein the processor compares the computed first value and a preset second value, and if the first value is greater than or equal to the second value, transmits the item.

13. The video call mediating apparatus of claim 11, wherein the item enables a terminal to establish a video call session with a terminal of an opposite gender user.

14. The video call mediating apparatus of claim 11, wherein the processor transmits the item to terminals of users of the first gender, who do not have a purchasing history in the video call platform.

15. The video call mediating apparatus of claim 14, wherein the processor randomly selects some of the users of the first gender not having the purchasing history and transmits the item to terminals of the selected users.

16. The video call mediating apparatus of claim 11, wherein the processor further computes a number of users of the first gender having definite demand for an opposite gender user and a third value that is a ratio of the number of the users of the first gender having definite demand to a number of entire users of the first gender, and prevents the item from being transmitted if the computed third value is greater than or equal to a preset fourth value.

17. The video call mediating apparatus of claim 16, wherein the users of the first gender having definite demand is a user who has 100% probability of being matched with an opposite gender user in all video call sessions.

18. The video call mediating apparatus of claim 11, wherein the processor establishes a video call session between two terminals selected from among the plurality of terminals.

19. The video call mediating apparatus of claim 11, wherein the processor further transmits the item to at least some of terminals of users of the first gender not connected to the video call platform.

* * * * *